No. 689,755. Patented Dec. 24, 1901.
J. SCHUMANN.
HEATING APPARATUS.
(Application filed May 4, 1898.)
(No Model.) 2 Sheets—Sheet 1.
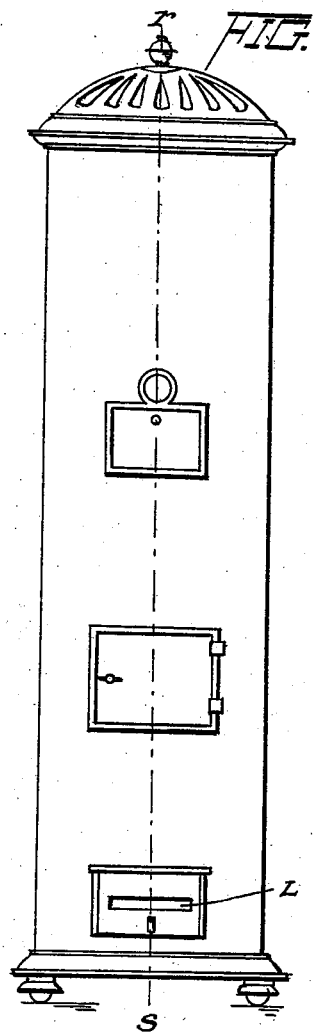
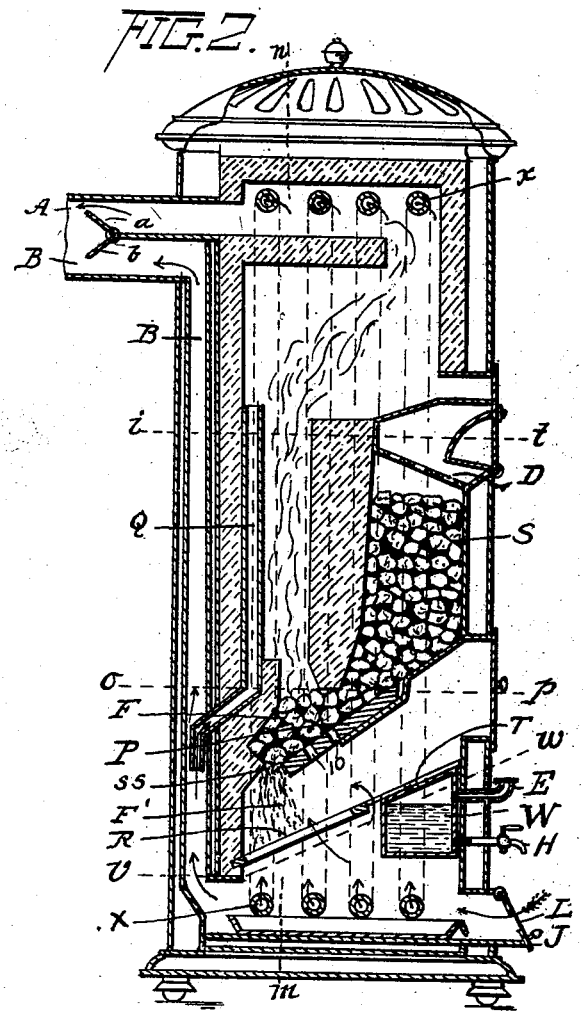
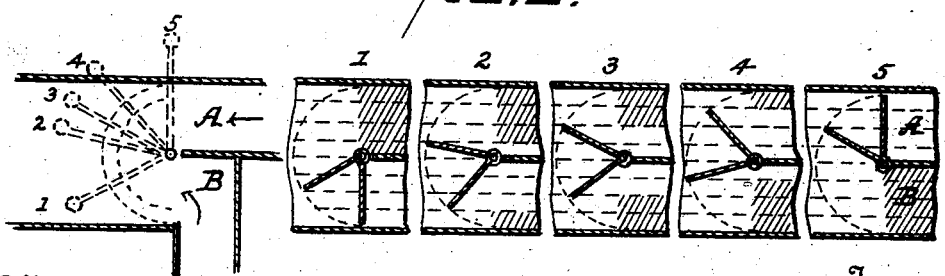
Witnesses
Saml R Turner
Alex Scott
Inventor
Johann Schumann.
By B. Singer
Attorney No. 689,755. Patented Dec. 24, 1901.
J. SCHUMANN.
HEATING APPARATUS.
(Application filed May 4, 1898.)
(No Model.) 2 Sheets—Sheet 2.
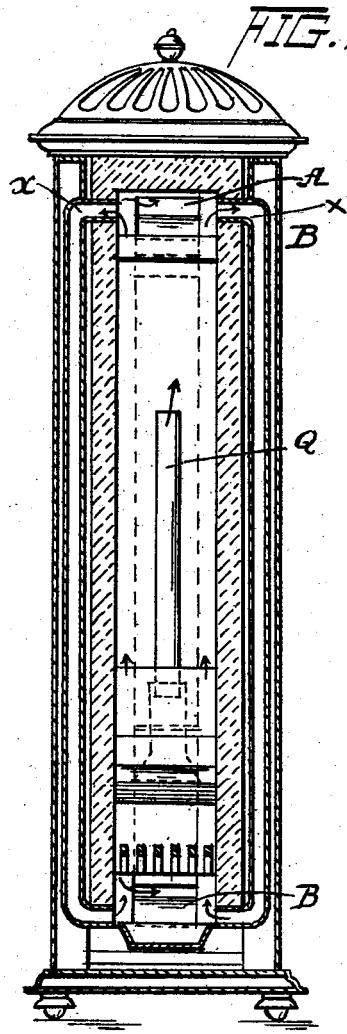
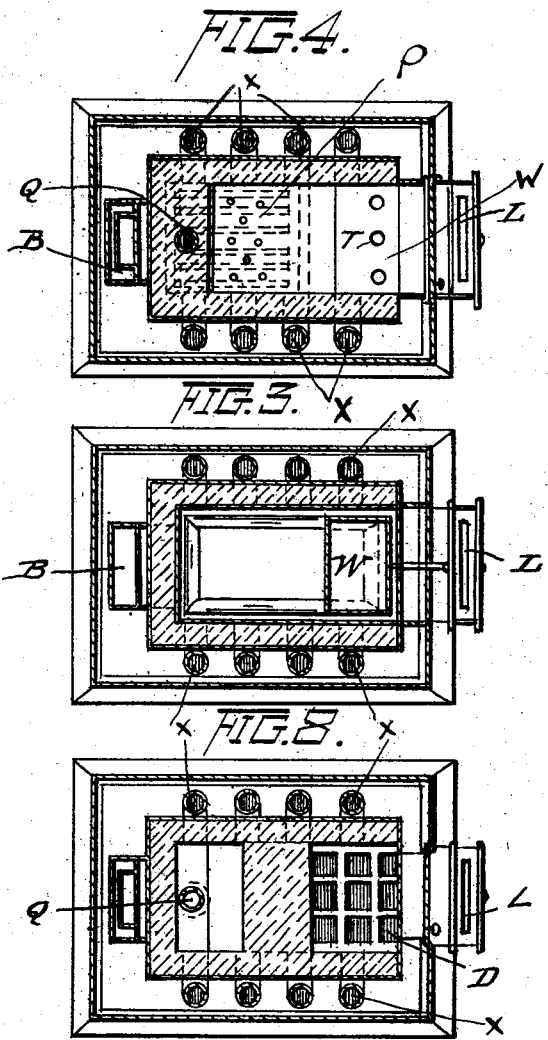
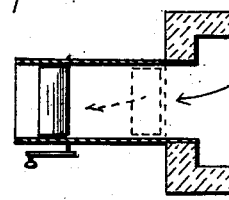
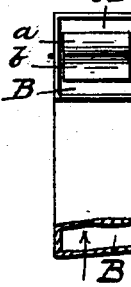
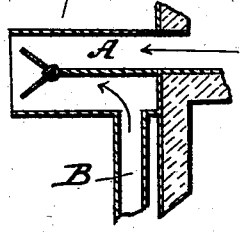
Witnesses
Saul R. Turner
Alp. Scott
Inventor
Johann Schumann.
By B. Singer.
Attorney

UNITED STATES PATENT OFFICE.

JOHANN SCHUMANN, OF LEMBERG, AUSTRIA-HUNGARY.

HEATING APPARATUS.

SPECIFICATION forming part of Letters Patent No. 689,755, dated December 24, 1901.

Application filed May 4, 1898. Serial No. 679,728. (No model.)

*To all whom it may concern:*

Be it known that I, JOHANN SCHUMANN, a subject of the Emperor of Austria-Hungary, residing at Lemberg, Galicia, Austria-Hungary, have invented certain new and useful Improvements in Heating Apparatus, of which the following is a specification.

The present invention concerns a heating apparatus having two smoke-flues with regulated openings, two combustion-chambers, and a plurality of heat-distributing pipes.

In the annexed drawings this apparatus is shown as applied, by way of example, to a stove.

Figure 1 is a view in elevation of a stove provided with my improved devices. Fig. 2 is a section on the line $r\,s$ of Fig. 1. Fig. 3 is a section on the line $v\,w$ of Fig. 2. Fig. 4 is a section on the line $o\,p$ of Fig. 2. Fig. 5 shows five positions of the damper in the smoke-flue. Figs. 6, $6^a$, and $6^b$ are sectional and detail views of the connection of the smoke-flues with the stove. Fig. 7 is a section on line $m\,n$ of Fig. 2. Fig. 8 is a section on line $i\,t$ of Fig. 2.

Referring to the drawings, near the center part of the stove is a vertical basin S for the fuel, provided at its upper part with a screen or trellis D and having its lower part communicating with a fire-box F by an opening having inclined upper and lower sides. The grate P is arranged obliquely in the fire-box, the front end extending to within a short distance of the front of the combustion-chamber, a slot or opening $s\,s$ being formed therebetween, and below the same is the water-reservoir W, with the inlet-tube E, the waste-cock H, and several openings T, above which a plate is fixed. Below the reservoir is the ash-box with the door J. Passing around the fuel-basin and fire-box from the top to the bottom of the stove are several tubes $x\,x$, connecting the upper or heating chamber with the lower or air chamber. At the rear of the stove is a draft-pipe Q, having its upper and lower ends open. The smoke-flues A B, provided with dampers $a\,b$ and leading to the chimney, are located at the rear of the stove.

The smoke-flue A being completely open, the fire is lighted on the fire-brick P, and the basin S is then filled with coal. The air entering the stove through the opening L of the door J feeds the lighted fuel, and this ignites the coal which is above it at the slit or opening $s\,s$. The coal in the fireplace F now burns and soon heats the iron pipe Q. It is now time to regulate the fire and to utilize the second smoke-flue B, the damper $b$ of which, together with the damper $a$, rotates on a common axle. The air entering at L and serving to feed the fire divides under the grate in such a way that there is only about one half of this air utilized for keeping the fire burning, while the other half would escape through the flue B into the chimney. The greater part, however, of the air which would so escape is drawn from the flue by the draft-pipe Q. The coal burns with the greatest intensity at the opening $s\,s$ of the basin S, and as soon as it is consumed to the size corresponding with the width of the opening it falls through this opening on the grate R below said opening, where it is completely burned. As the coal at the lower end of the fuel-box S is subjected to a high heat, the condition of the coal will be changed, and as it moves downward to the slot $s\,s$ allows the coal in rear thereof to be more intensely heated before kindling, thereby first yielding their sublimates to be more easily separated, burning afterward in the form of coke. The division of air corresponds with the position of the dampers $a\,b$, and the coal burns with an intensity corresponding with the division of the air.

The opening $s\,s$, formed by the fire-brick P, can be placed according to the nature of the combustible. This brick P may be solid and with smooth surface, but for coal which burns with difficulty the brick may be provided with holes 10 to allow a stronger current of air to pass through the coal, the latter form being shown in the drawings, it being obvious that the holes may be omitted when such construction is desired.

When the flue A is completely closed, there is no fear of the smoke escaping from the stove into the room, for it enters the pipes $x\,x$ at the top of the stove and is discharged therefrom at the bottom into the ash-box. It is here mixed with the air and is brought partly into the fireplace F' and partly through the smoke-flue B into the chimney.

The smoke-flues A and B may have any desired section according to need. They may also be separated from each other, but are always provided with dampers joined together, so that if one of the pipes is closed the other is open in the same proportion.

Having thus described my invention, what I claim, and desire to secure by Letters Patent, is—

1. In a heating apparatus the combination with a suitable cylinder or shell, of a fuel-box having an inclined bottom, and with an opening at the lower extremity of the bottom, an air-chamber below said fuel-box, a heating-chamber above the fuel-box, and a plurality of flues or pipes communicating with said air-chamber and heating-chamber, substantially as set forth.

2. In a heating apparatus the combination with a suitable cylinder or shell, of a fuel-box having an inclined bottom and with an opening at the lower extremity of said bottom, a heating-chamber above the fuel-box, an air-chamber below said fuel-box, and communicating therewith, a smoke-draft and a plurality of flues or pipes, said draft and pipes communicating with the air-chamber below the fuel-box, and the heating-chamber in the upper part of the casing or shell, substantially as set forth.

3. In a heating apparatus, the combination with a suitable cylinder or shell, of a fuel-box having an inclined bottom, and with an opening at the lower extremity of said bottom, an air-chamber below said fuel-box, and communicating therewith, a heating-chamber above the fuel-box, and communicating therewith, a smoke-draft and a plurality of flues or pipes communicating with the heating and air chambers above and below the fuel-box, and a smoke-pipe having a division therein, the space on one side of said division communicating with the heating-chamber above the fuel-box, the space on the other side of said division communicating with the air-chamber below the fuel-box, and a double damper located in said smoke-pipe, and adapted to simultaneously close one division in the smoke-pipe and open the other, substantially as set forth.

In witness whereof I have hereunto signed my name, this 9th day of April, A. D. 1898, in the presence of two subscribing witnesses.

JOHANN SCHUMANN.

Witnesses:
HENRY C. CARPENTER,
CHAS. E. CARPENTER.